United States Patent
Michiuchi

[15] 3,664,209
[45] May 23, 1972

[54] APPARATUS FOR ATTACHING A STEERING HANDLE TO A TWO-WHEEL VEHICLE

[72] Inventor: Masayuki Michiuchi, Hamamatsu, Japan
[73] Assignee: Honda Giken Kogyo Kabushiki Kaisha, Tokyo, Japan
[22] Filed: Sept. 8, 1970
[21] Appl. No.: 70,076

[30] Foreign Application Priority Data

Apr. 4, 1970 Japan..................................45/31903

[52] U.S. Cl............................74/551.3, 74/551.6, 287/54 E
[51] Int. Cl.......................................................B62k 21/24
[58] Field of Search..........................74/551.3, 551.6, 551.1; 287/54 E

[56] References Cited

UNITED STATES PATENTS 549,792  11/1895  Hood....................................74/551.3
757,154  4/1904   Tate.....................................74/551.6
3,391,582 7/1968  Polley, Jr...............................74/551.1

FOREIGN PATENTS OR APPLICATIONS 912,868  8/1946  France................................74/551.3

Primary Examiner—William F. O'Dea
Assistant Examiner—F. D. Shoemaker
Attorney—Waters, Roditi, Schwartz & Nissen

[57] ABSTRACT

An apparatus for attaching a steering handle in a two-wheel vehicle comprises a handle post secured to a bracket supporting a steering handle, the handle post being rotatably and removably attached to a steering stem within a head pipe, the bracket being provided with a fixing member connectable with and disconnectable from the front wheel fork.

8 Claims, 2 Drawing Figures

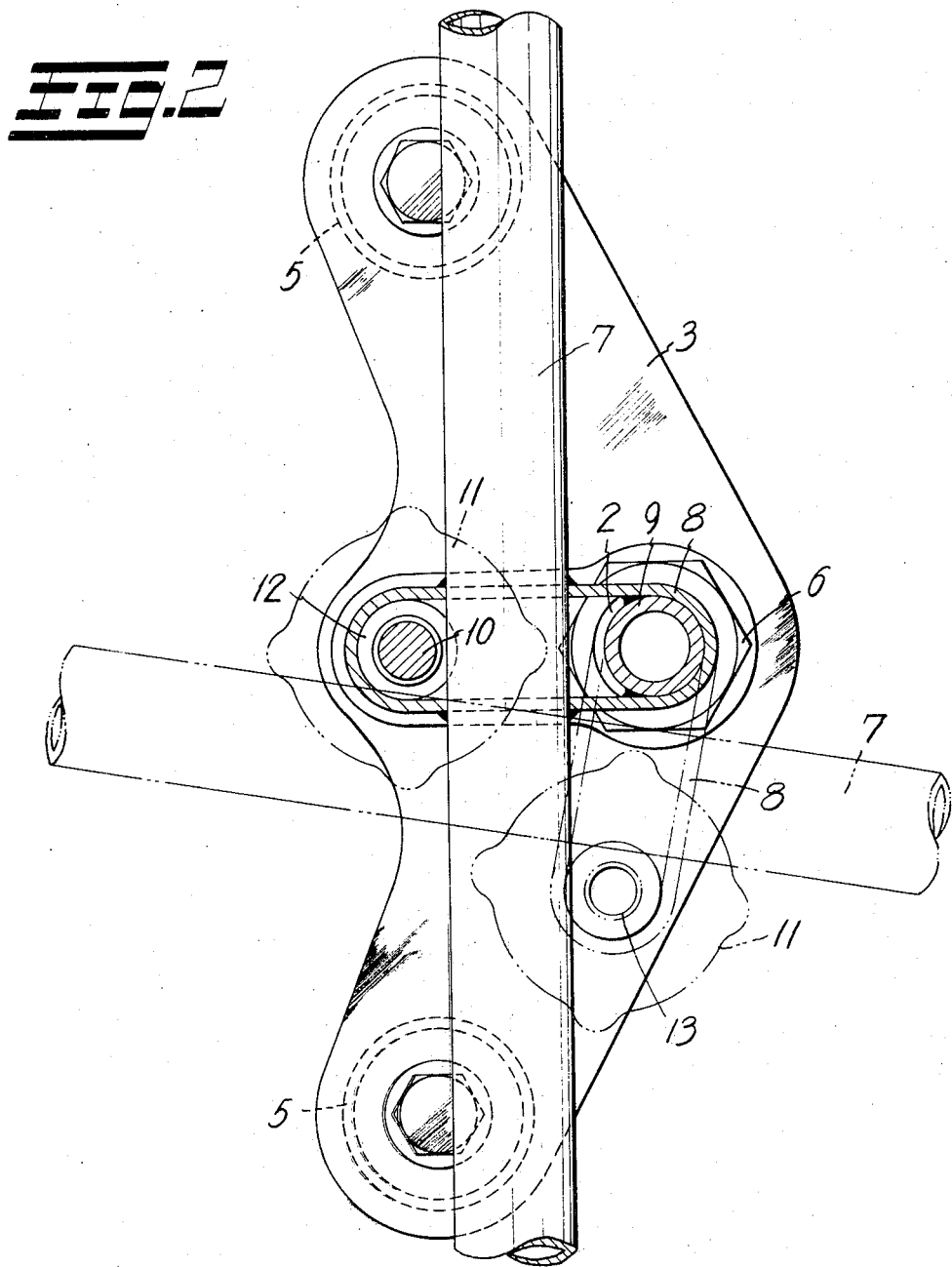

APPARATUS FOR ATTACHING A STEERING HANDLE TO A TWO-WHEEL VEHICLE

BRIEF SUMMARY OF THE INVENTION

This invention relates to apparatus for attaching a steering handle in a two-wheeled vehicle wherein, by a simple operation, the steering handle can be rotated to a storage position parallel with the vehicle body or removed from the body.

Generally, the steering handle in a two-wheel vehicle projects outwardly on both sides of the vehicle body, and therefore the handle is obstructive and inconvenient for transport or storage of the vehicle.

Accordingly, the invention contemplates a steering handle supported on a steering stem on a head pipe so as to be rotatable thereabout and also removable in the axial direction thereof, whereby storage transport, or repairs of the two-wheel vehicle can be facilitated either by rotating the steering handle to a position nearly parallel with the vehicle body or by removing the handle from the steering stem.

BRIEF DESCRIPTION OF THE DRAWING

FIG. 2 is a cross sectional view taken along line II—II in FIG. 1.

DETAILED DESCRIPTION

Figure 1:
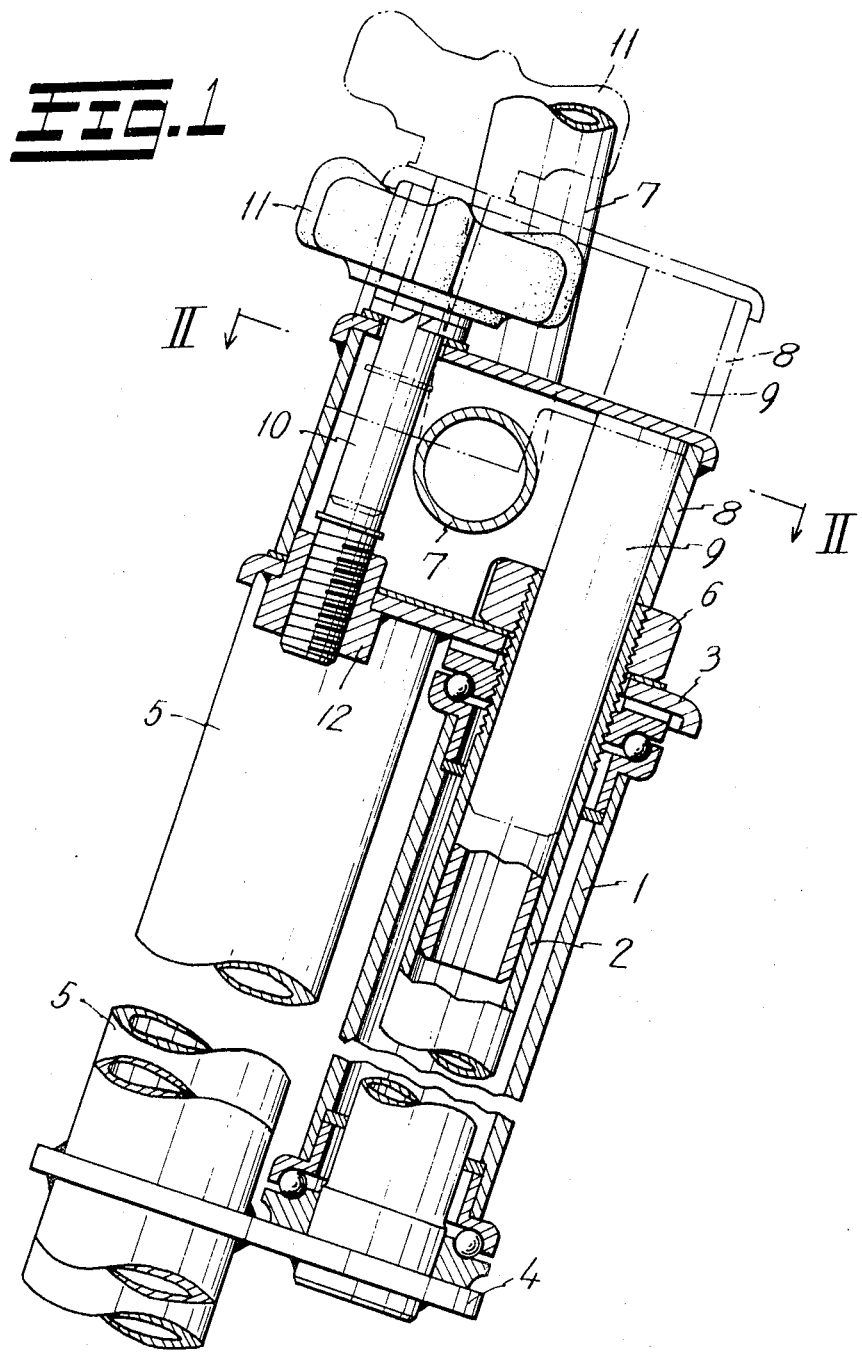
FIG. 1 is a longitudinal sectional view of the apparatus according to the invention.

A head pipe 1 is secured to a front portion of the body of a two-wheel vehicle and a steering stem 2 is rotatably supported in the head pipe 1 through bearings. A lower bridge 4 of a front-wheel fork 5 is fixed to the lower end portion of the steering stem 2 and an upper bridge 3 of the front-wheel fork 5 is mounted on the upper portion of the steering stem 2 such that the front-wheel fork 5 can be rotatably supported on the head pipe 1 by the threaded engagement of a nut 6 on the upper end of the steering stem 2.

A handle post 9 is rotatably mounted in the upper end of the steering stem 2 and is extractable therefrom, and a bracket 8 supporting a steering handle 7 instead therethrough is secured to the upper portion of the handle post 9. At the top end of the bracket 8, there is inserted a screw rod 10 having a knob 11, and this screw rod 10 is engageable with a nut 12 fixed at the middle portion of the upper bridge 3.

If the screw rod 10 is screwed into the nut 12 as illustrated in FIGS. 1 and 2, the steering handle 7 is fixed to the front-wheel fork 5 through the bracket 8, so that the front-wheel fork 5 can be rotated along with the steering handle 7 (right and left about the steering stem 2). Thus the steering handle 7 can be secured in an operative position of ordinary use in relation to the vehicle body. For rotating the steering handle 7 from the operative or use position (shown in solid lines in FIG. 2) to a storage position (shown in chain dotted lines in FIG. 2) nearly parallel with the vehicle body, the screw rod 10 is turned in its loosening direction by engaging the knob 11 and is removed from the nut 12 and the bracket 8 is pulled upward, and then the steering handle 7 is turned about 90 degrees with respect to the steering stem 2, whereby the steering handle 7 is brought into the storage position nearly parallel with the vehicle body. In the storage position of the steering handle 7, the screw rod 10 can be screwed into a housing 13 in the upper bridge 3 and thus the steering handle 7 can be secured in its storage position.

Additionally, the steering handle 7 can be withdrawn in entirety from the steering stem 2 together with the handle post 9 and stored separately.

The screw rod 10 can be replaced by any other fixing member, and in this case the nut 12 will be replaced by a member cooperating with said fixing member.

According to the invention, as described above, the steering handle can be freely rotated in the steering stem when released from the front-wheel fork, so that as occasion demands the steering handle can be rotated to its storage position nearly parallel with the vehicle body. Additionally, the handle can be removed from the steering stem for convenience in storage, transport, repairs etc. of the vehicle. Additionally, the joining and separating operations between the steering handle and the front-wheel fork can be effected merely by manipulating only a single fixing member, so that these operations are very simple.

Additionally, since the steering handle is supported at two points, that is, by the handle post and the fixing member when the same is in its operative position, the attachment thereof is secure and reliable.

What is claimed is:

1. Apparatus for attaching a steering handle to the frame of a two-wheel vehicle comprising a head pipe secured to the frame, a steering stem rotatably supported in said head pipe, a handle post secured to the steering handle and rotatably and removably mounted in the stem, a front wheel fork secured to said stem, a bracket secured to said handle post, and attachment means for detachably fixing the post and stem for common rotation and detachably fixing said post and fork together, said attachment means comprising an attachment member engageable with said bracket and said fork.

2. Apparatus as claimed in claim 1 wherein said attachment member is a threaded fastener threadably engageable with said fork.

3. Apparatus as claimed in claim 2 wherein said threaded fastener is supported by said bracket to hold the bracket and handle post in secured relation with said fork and steering stem.

4. Apparatus as claimed in claim 3 wherein said fork includes upper and lower bridge members secured to said steering stem, said attachment means further comprising a nut secured to said upper bridge member to receive said fastener.

5. Apparatus as claimed in claim 2 wherein said bracket and handle are rotatable through an angle of about 90° to a storage position when the attachment member is disengaged from said fork.

6. Apparatus as claimed in claim 5 comprising means on said fork for threadably engaging the attachment member in the storage position.

7. Apparatus as claimed in claim 6 wherein said attachment member comprises a manually engageable knob thereon.

8. Apparatus as claimed in claim 1 wherein said attachment member is a single member which must be manipulated for fixing the post and stem for common rotation.

* * * * *